United States Patent Office 3,236,735
Patented Feb. 22, 1966

3,236,735
BARIUM SULFATE AND LOW VISCOSITY MONO-SACCHARIDE POLYMER X-RAY CONTRAST MEDIA
Garland R. Brown, Saginaw, Mich., assignor to Mallinckrodt Chemical Works, St. Louis, Mo., a corporation of Missouri
No Drawing. Filed Sept. 14, 1962, Ser. No. 223,805
11 Claims. (Cl. 167—95)

This invention relates to X-ray contrast media and more particularly to barium sulfate media and compositions useful for preparing such media.

Briefly the invention is directed to compositions comprising a major proportion of barium sulfate and a minor proportion of a non-toxic fluidizing agent consisting essentially of at least one member of the group consisting of water-dispersible colloidal salts of anionic ether and ester derivatives of low polymers of monosaccharides.

Among the objects of the invention may be mentioned the provision of improved X-ray contrast media; the provision of improved barium sulfate compositions which are rapidly dispersible; the provision of improved barium sulfate compositions which are highly fluid at high barium sulfate concentrations; and the provision of compositions suitable for the rapid preparation of barium sulfate suspensions. Other objects and features will be in part apparent and in part pointed out hereinafter.

The invention accordingly comprises the products hereinafter described, the scope of the invention being indicated in the following claims.

In accordance with the present invention, the fluidity of barium sulfate suspensions is much improved and their preparation greatly facilitated by including in the aqueous medium a non-toxic fluidizing agent consisting of a water-dispersible colloidal salt of an anionic ether or ester derivative of a low polymer of a monosaccharide such as a water-soluble salt of an anionic ether or ester derivative of a low polymer glucan. By glucan is meant a polymer or glucose, such as cellulose, starch, dextran, etc. Salts of low polymer anionic ether or ester derivatives of monosaccharides other than glucose as well as the free acids are similarly useful. By anionic derivative is meant a derivative which will combine with a cation to form a salt. A preferred anionic glucan derivative is an extra-low viscosity sodium carboxymethylcellulose (CMC), but other anionic ether or ester derivatives of glucans or other polysaccharides may also be used. The term "extra-low viscosity" is used herein to distinguish the material employed in the present invention from other sodium carboxymethylcelluloses used in the past. More particularly it defines a material having a viscosity rating (2% weight/weight aqueous solution at 25° C.) not greater than approximately 50 centipoises (cps.).

The sodium CMC should have a degree of polymerization corresponding to a viscosity rating not greater than approximately 50 cps., and preferably less than 18 cps. The degree of polymerization may be as low as desired, provided the sodium CMC retains its colloidal characteristics.

A degree of substitution of at least 0.35 is necessary in order for the sodium CMC to have sufficient water dispersibility. The degree of substitution may be as high as 1.40 provided that the degree of polymerization is correspondingly low. A degree of substitution higher than about 1.40 has been found undesirable because it may lead to excessive cross-linking with certain other useful additives, and it increases the settling rate of the barium sulfate. Optimum results have been obtained using sodium CMC having a degree of substitution in the range of 0.65 to 0.85.

In suitable concentrations, such a sodium CMC aids in dispersing barium sulfate quickly and easily. At least 0.04% weight/weight of the sodium CMC (based on the barium used) is necessary. Above approximately 0.4% weight/weight the effectiveness of the sodium CMC decreases, although useful results have been obtained at concentrations as high as 1% weight/weight. Optimum results are obtained at a concentration of 0.06–0.14% weight/weight.

At these concentrations, an extra-low viscosity sodium CMC has no appreciable effect on either the surface tension or the viscosity of the aqueous medium. Such a material therefore does not have the viscosity-increasing effect for which higher polymer sodium carboxymethylcelluloses have heretofore been used in barium sulfate suspensions.

On standing, any suspension of a heavy insoluble material such as barium sulfate will settle in accordance with Stokes' law. Such settling may be retarded by increasing the viscosity of the aqueous medium. Certain sodium carboxymethylcelluloses have been used for that purpose in the past, but the materials were of substantially higher degrees of polymerization than that used in the present invention. These higher viscosity substances do not have the fluidizing effect of the extra-low viscosity material, nor do they disperse in water as quickly and easily. For these reasons they do not permit the preparation of fluid suspensions containing as much as 40% weight/weight of barium sulfate.

A fluidizing effect somewhat similar to that of extra-low viscosity CMC has been claimed for certain extracts of algae, seaweed, etc. In addition to being of uncertain and variable composition, such extracts must be used in substantially higher proportions than the fluidizing agents of the present invention.

The final suspension may be prepared from the individual components just prior to use. Usually however it is more convenient to prepare a concentrate containing the additives with or without the barium sulfate. Such a concentrate can be prepared in large quantities and stored for extended periods. The final suspension is then prepared as needed by combining this concentrate with suitable proportions of barium sulfate and/or water.

A liquid concentrate containing all the additives but without the barium sulfate is particularly useful for preparing suspensions which may have varying barium sulfate contents. To prepare the final suspension, the liquid concentrate is combined with the required proportions of water and barium sulfate. Because of the presence of the extra-low viscosity sodium CMC, the barium sulfate disperses easily and quickly to form a smooth uniform suspension. Such a liquid concentrate is particularly useful for preparing suspensions which may contain from 40% to 65% weight/weight or more of barium sulfate.

A dry composition containing both the barium sulfate and additives is particularly convenient and economical to store and ship. Such a composition is primarily used for the preparation of suspensions having a predetermined barium sulfate content, since the concentrations of the additives in the aqueous medium of the suspension are somewhat critical while the proportions of barium sulfate and additives in the dry composition are necessarily fixed.

Such a dry composition may be prepared by combining the required proportions of barium sulfate and additives using a convenient amount of water, and then removing the water by drying, as for example by spray- or film-drying the initial suspension. The resulting dry product consists of barium sulfate particles coated with the additives. The final suspension is then easily prepared as needed by stirring the dry composition into the required amount of water.

A dry composition may also be prepared by blending the dry ingredients in the conventional manner, but there is some advantage to using a wet process, as outlined above, since a more even distribution of all ingredients is thereby obtained.

If preferred, a dry composition may also be prepared consisting essentially of the additives. This composition may then be mixed with an appropriate proportion of barium sulfate and of water to form the final barium sulfate containing composition.

A concentrate in paste form may be prepared in a manner similar to the first method described above for preparing the dry composition, except that the initial liquid suspension is only partially dehydrated. Such a paste is useful when it is desired to include additives of a kind and/or in concentrations that would be unsuitable for a dry composition. Such a paste is also useful as a contrast agent in the X-ray study of such structures as the esophagus and hypopharynx.

The function performed by the fluidizing agents in the present invention is to prevent agglomeration of the barium sulfate particles during preparation of the suspension. As a result, the barium sulfate particles are rapidly dispersed and do not form heavy or sticky lumps or masses which are difficult to disperse. In the concentrations employed, the polysaccharide derivatives do not have any appreciable effect on surface tension or viscosity, and so do not act as suspending or dispersing agents in the usual manner. It appears that these anionic low polymer colloids are adsorbed by the barium sulfate particles, intensifying the negative charge thereon and thus inhibiting, by electrostatic repulsion, any tendency for several individual particles to agglomerate or flocculate Also, because of the increased negative charge immediately surrounding the barium sulfate particles, the water bound to the surface decreases, releasing this water for filling the spaces between the particles and increasing the flowability of the suspension. This effect also appears to be enhanced to some extent by the presence of one or more of certain other types of additives. While the above postulated mechanism is believed to account for the desirable properties of the compositions of the invention, the utility of the invention is not dependent on the accuracy of such postulates.

With the aid of these fluidizing agents it is possible to prepare highly fluid suspensions having a high content of barium sulfate. Moreover, these suspensions retain their desirable characteristics in the gastrointestinal tract and are therefore particularly valuable as radiographic contrast media.

The essential characteristics of the polysaccharide derivatives useful in this invention are the anionic character of the substituent ether or ester group and the very low viscosity of dilute aqueous solutions of such derivatives.

Sodium carboxymethylcellulose is a preferred agent because of its low toxicity and availability at reasonable cost. Other useful cellulose derivatives include other anionic ether derivatives such as carboxymethylhydroxyethylcellulose and sulfoethylcellulose, and anionic ester derivatives, such as sodium cellulose sulfate. Useful derivatives of other glucans include similar derivatives of starch and dextran, such as carboxymethyl starch, carboxymethyl dextran and sodium dextran sulfate.

Derivatives of low polymers of monosaccharides other than glucose are similarly useful. An example is a low molecular weight carrageenin derivative obtained by degrading and/or fractionating carrageenin. Carrageenin, an extract obtained from certain types of seaweed, is a sulfated polysaccharide, the dominant hexose units of which are galactose and anhydrogalactose.

While sodium salts are preferred, other water-soluble non-toxic salts are also useful. For example, the cation may be ammonium or another alkali metal, such as potassium. Free acid derivatives are also effective.

Extra-low viscosity sodium CMC is compatible with a wide range of other useful additives and these may be included in the suspensions to impart certain desirable properties and characteristics. Moreover, the sodium CMC enhances the effectiveness of certain of these additives so that a given effect is achieved using smaller quantities.

For example, extra-low viscosity sodium CMC enhances the effectiveness of a non-ionic cellulose derivative, such as hydroxyethylcellulose, as a suspending and anti-settling agent. Small amounts of such agents are therefore useful to retard settling of the barium sulfate, but an excess should be avoided because of their tendency to increase the viscosity of the suspension and because they tend to lower surface and interfacial tensions in the suspensions, which may cause excessive foaming in some radiological procedures.

Certain types of low viscosity carrageenin comprise salts of calcium or other polyvalent cations. When such carrageenins are mixed in the proper concentration and ratios with CMC, in accordance with the invention, weak cross-linking between the carrageenin and the anionic carboxymethyl groups of the CMC appears to occur through the polyvalent cations, producing a weak gel structure. When barium sulfate suspensions containing such combinations of fluidizing agents are at rest or flowing very slowly, the gel structure rapidly develops, impedes settling, and generally improves coating of the gastrointestinal tract. On the other other hand, under conditions of rapid flow, such as during oral ingestion or introduction as an enema, the weak gel structure is broken and does not significantly reduce the high fluidity imparted to the highly concentrated suspension by the fluidizing agents as herein described. This weak gel formation or interaction between the CMC and carrageenin permits both fluidizing agents to exert their optimum effect, yet provides improved coating and anti-settling features as described. Although the cross-linking interaction has been described in terms of a carrageenin containing polyvalent cations and CMC, the effect is not limited to these particular combinations, as similar effects may be obtainable with other combinations of anionic ether and ester derivatives of low molecular weight polymers of monosaccharides in the presence of polyvalent cations. While the above postulated mechanism is believed to account for the desirable properties of the compositions discussed, the utility of the invention is not dependent upon the accuracy of such postulates.

The sodium CMC also enhances the effectiveness of bentonite as an anti-settling and anti-caking agent. Bentonite is a useful suspending agent for barium sulfate to retard settling of the barium sulfate prior to its administration. Unfortunately, it is not compatible with gastric secretions, and used alone or in large quantities it will increase flocculation of the barium sulfate in the intestine. In limited amounts, it too is a useful anti-settling agent alone or in combination with a non-ionic cellulose derivative. In the latter case the optimum amount of either substance is still further reduced whereby their less desirable effects are minimized. A suitable concentration of bentonite in a 60% weight/weight barium sulfate suspension is approximately 0.6% weight/weight (based on the water used). A very fine bentonite of the high-swelling, sodium, Wyoming type is preferred.

Because of the dehydrating effect of the colon, it is often desirable to include in the suspensions a suitable amount of some hydrophilic substance. Suitable substances for this purpose are the non-toxic polyhydric alcohols, for example, polyethylene glycol, polypropylene glycol, sorbitol and/or mannitol. Commercially available in concentrated aqueous solution, sorbitol is particularly useful in a liquid concentrate. Such substances have the further desirable effect of sweeting the suspension and making it more palatable for oral adminstration while having a minimal metabolic effect.

Small amounts of wetting agents and anti-foaming agents may also be advantageously included, but such agents should be used cautiously since an excess of either may cause foaming or otherwise adversely affect the properties of the suspension for certain diagnostic techniques.

The optimum concentration for any particular additive is to a considerable degree dependent upon the kinds and proportions of the other additives present in the suspension. It may also vary somewhat with the physical characteristics of the barium sulfate used. Therefore, no definite limits can be given. Generally, however, the optimum concentrations of the conventional additives are substantially less than when these same substances have been used in the past, owing in part to their enhanced effectiveness in the presence of sodium CMC and in part to lesser need for such additives in the suspensions of the present invention.

At least two general types of barium sulfate suspensions are now used in radiography. Pasty preparations, usually prepared with the aid of some thickening agent, are intended primarily for oral administration and are most useful for visualizing the esophagus. Most common are fluid suspensions containing about 20-40% weight/weight barium sulfate which are given either orally or rectally and are used for the detection of various lesions and abnormalities of the intestinal mucosa. For example, in the air contrast examination of the colon, a barium enema is given and evacuated after which the colon is inflated with air. Under optimum conditions, the barium-coated colon casts a semi-transparent X-ray shadow having a striking three-dimensional quality which clearly shows the structure and condition of the mucosa and permits the detection of even small polyps and other abnormalities. This technique is of great value for the early detection of cancer.

The highly fluid barium sulfate suspensions of exceptional density which may be prepared in accordance with the invention permit simplification of the air contrast technique while at the same time yielding improved results. Using such suspensions a direct air contrast examination of the colon can be performed by placing only a small amount of a 60% weight/weight barium sulfate suspension (125-200 cc.) in the colon and letting it flow through the colon ahead of a column of air, leaving a thin, dense film of barium sulfate on the colon wall. The necessity of administering a large volume of barium sulfate suspension and then having the excess evacuated is thus eliminated. This has the advantage of giving an excellent air contrast examination in less time and with greater ease. The dense barium sulfate suspension prepared in accordance with the invention, because of its high specific gravity, will entrap any remaining small fecal particles in the colon and will hold them in suspension, thus preventing the production of artifactual fecal defects on the mucosal wall, which might be mistaken on the X-ray film for a polyp or other abnormality of the mucosal wall. In addition, the high fluidity allows the examination to be performed in a shorter period of time, thus decreasing the radiation to the patient from the examination and increasing the productivity of the examiner.

In addition to the strictly radiological advantages of the compositions of the invention, such compositions are extremely easy to prepare. The dry ingredients of the novel combinations need only to be combined with the required amount of liquid in a paper cup, briefly shaken or stirred with a spoon and administered to the patient. This makes it especially easy to prepare the desired type and quantity of contrast medium extemporaneously at the time the individual patient is ready for it. This is in distinction to the previously known compositions which often require mechanical stirring, sometimes for prolonged periods of time, or other special techniques of preparation.

Such special requirements have often led busy radiological clinics and hospitals to adopt the practice of preparing the estimated day's requirements of the contrast medium all at one time. In some instances this preparation must be started on the previous day. In addition to the special mixing equipment, large containers, etc., which must be used and cleaned daily, such practices tend to be wasteful of the excess contrast medium which must either be held over for use on a succeeding day or else discarded.

In addition, the wide range of other additives with which the anionic low polymer polysaccharide derivatives may be used permits modifying the properties of the suspension over a wide range in order to satisfy particular requirements.

The following examples illustrate the invention.

Unless otherwise specified, the following particulars apply to data disclosed in the examples:

(1) Anionic polysaccharide derivatives are characterized in terms of the viscosity of a 1 or 2% weight/weight aqueous solution, determined by means of the Brookfield viscometer, model LVF, using a No. 1 spindle at 60 r.p.m. Data are reported in centipoises (cps.).

(2) Viscosity data on the barium sulfate suspensions were determined by means of the Ford cup viscometer, using a No. 4 orifice. Data are reported in seconds.

(3) The barium sulfate used was obtained by purifying milled barytes, and conformed to U.S.P. specifications.

*Example 1*

|  | G. |
|---|---|
| Barium sulfate | 150 |
| Sodium CMC-XL[1] | 1 |
| Water | 100 |

[1] Sodium CMC-XL has a degree of substitution (D.S.) of 0.65-0.85 and a 2% viscosity less than 18 cps.

The sodium CMC was dissolved in the water and the barium sulfate was incorporated rapidly with moderate stirring. The resulting fluid suspension had a viscosity (Ford cup, No. 4 orifice) of 11.5 seconds. It gave good results in air contrast radiography of the colon but settled fairly rapidly to a relatively hard cake on standing undisturbed for several hours.

*Example 2*

|  | G. |
|---|---|
| Barium sulfate | 2500 |
| Sodium CMC-XL | 2.0 |
| Mannitol | 25.0 |
| Calcium disodium ethylenediaminetetraacetate | 8.0 |
| Water | 1670 |

The minor dry ingredients are dissolved in the water and the barium sulfate is incorporated rapidly with moderate stirring. The suspension is highly fluid. Viscosity (No. 4 Ford cup): 11.5 seconds. It gives excellent coating of the colon in the air contrast technique. It settles to a moderately hard sediment in 24 hours but redisperses with moderate agitation.

*Example 3*

| Sodium CMC-XL | g | 54 |
|---|---|---|
| Hydroxyethylcellulose, low viscosity | g | 36 |
| Sorbitol, 70% solution | g | 1542 |
| Mannitol | g | 360 |
| Bentonite | g | 255 |
| Polysorbate 80 | g | 18 |
| Methylsiloxane Antifoam (Dow-Corning Antifoam AF, 1% emulsion) | ml | 80 |
| Water | g | 1172 |

100 ml. of this concentrate is added to a liter of water and barium sulfate (1500 g.) is incorporated rapidly. Viscosity (No. 4 Ford cup): 11.8 seconds. The suspension is highly fluid and provides excellent coating of the colon. A minimal soft sediment deposits on 24 hours' standing but is readily redispersed.

Example 4

| | G. |
|---|---|
| Barium sulfate | 150 |
| Sodium carboxymethylhydroxyethylcellulose[1] | 0.2 |
| Mannitol | 5 |
| Water | 100 |

[1] A combination of type 37 which has an average substitution of 0.3 carboxymethyl group and 0.7 hydroxyethyl group and type 45 which has an average substitution of 0.4 carboxymethyl group and 0.5 hydroxyethyl group, per anhydroglucose unit; 2% viscosity, 15–20 cps.

The minor dry ingredients are dissolved in the water, and the barium sulfate is incorporated rapidly with moderate stirring. Viscosity (No. 4 Ford cup): 11.9 seconds. In direct air contrast examination of the colon there was excellent coating with a few air bubbles. There was no appreciable sedimentation when the suspension stood for an hour. Redispersion of the slight deposit was immediate.

Example 5

| | G. |
|---|---|
| Barium sulfate | 150 |
| Sodium cellulose sulfate (2% viscosity, 25 cps.) | 0.2 |
| Water | 100 |

The cellulose ester was dissolved in the water, and the barium sulfate was incorporated rapidly with moderate agitation. Viscosity, 12.0 seconds.

On standing, the barium sulfate settled very slowly. After 24 hours' settling the sediment was immediately dispersed with moderate agitation.

Example 6

| | G. |
|---|---|
| Barium sulfate | 150 |
| Sodium sulfoethylcellulose (2% viscosity, 20 cps.) | 0.2 |
| Water | 100 |

The barium sulfate dispersed easily and rapidly in the aqueous solution of the sulfoethylcellulose. Viscosity, 11.7 seconds.

The suspension foamed slightly when agitated and deposited a slightly hard sediment on standing 24 hours. The sediment redispersed fairly readily with moderate agitation.

Example 7

| | G. |
|---|---|
| Barium sulfate | 150 |
| Sodium cellulose acetate sulfate (2% viscosity, 35 cps.) | 0.3 |
| Water | 100 |

The barium sulfate dispersed easily and fairly rapidly in the aqueous solution of the cellulose derivative. Viscosity, 12 seconds.

The properties of the suspension were quite similar to those of the suspension of Example 4.

Example 8

| | G. |
|---|---|
| Sodium dextran sulfate (S: 13.1%) (made from dextran, average molecular weight 75,000) | 0.15 |
| Barium sulfate | 150 |
| Water | 100 |
| Sorbitol (crystalline) | 4 |

The barium sulfate dispersed easily and rapidly in the solution consisting of the other ingedients. Viscosity, 10.7 seconds.

After settling for 24 hours the small amount of sediment redispersed immediately with moderate agitation.

Example 9

| | G. |
|---|---|
| Sodium dextran sulfate (S: over 14%; molecular weight below 15,000) | 0.125 |
| Barium sulfate | 150 |
| Sorbitol | 4 |
| Water | 100 |

The properties of the suspension were quite similar to those of the suspension of Example 8. Viscosity, 10.5 seconds.

Example 10

| | G. |
|---|---|
| Sodium dextran sulfate (S: 12.7% made from dextran of molecular weight 200,000–300,000) | 0.175 |
| Barium sulfate | 150 |
| Water | 100 |
| Sorbitol | 4 |

The properties of the suspension were quite similar to those of the suspension of Example 8. Viscosity, 10.5 seconds.

Example 11

| | G. |
|---|---|
| Sodium dextran sulfate (S: 11.5%; made from dextran of molecular weight 5–40 million) | 0.25 |
| Barium sulfate | 150 |
| Water | 100 |
| Sorbitol | 4 |

The properties of this suspension were quite similar to those of the suspension of Example 8. Viscosity, 10.5 seconds.

Example 12

| | G. |
|---|---|
| Sodium dextran sulfate (14.3% S; made from dextran of average molecular weight 15,000–20,000) | 0.125 |
| Barium sulfate | 150 |
| Water | 100 |
| Sorbitol | 4 |

The properties of this suspension were quite similar to those of the suspension of Example 8. Viscosity, 10.5 seconds.

Example 13

| | G. |
|---|---|
| Sodium carboxymethyl dextran (made from dextran of molecular weight 15,000–20,000) | 0.20 |
| Barium sulfate | 150 |
| Water | 100 |

The barium sulfate dispersed easily and rapidly in the solution consisting of the other ingredients. On standing for 30 minutes, the suspension deposited a slimy sediment which redispersed with moderate agitation.

Example 14

| | | |
|---|---|---|
| Sorbitol, 70% solution | ml | 249 |
| Citric acid | g | 5.68 |
| Sodium saccharin | g | 1.42 |
| Sodium dextran sulfate (S, 14.3%; prepared from dextran of average molecular weight 15,000–20,000) | g | 6.82 |
| Barium sulfate | g | 8520 |
| Water | ml | 5430 |

The citric acid, saccharin and dextran sulfate were dissolved in separate portions of the water. One-sixth of the dextran sulfate solution was set aside and the remainder was combined with all the other liquids. The barium sulfate was incorporated in this solution and the remainder of the dextran sulfate solution was added. This suspension was dried on a drum drier and the product was passed through a sieve, yielding a free flowing dry concentrate.

150 grams of this concentrate dispersed rapidly and easily in 100 ml. of water to form a fluid contrast medium having a viscosity (Ford cup, No. 4 orifice) of 10.5 seconds. The medium flowed readily in the air contrast technique and provided very good coating of the colon wall with no drying, flaking or flocculation. In the upper gastro-intestinal tract it provided excellent air contrast coating of the stomach mucosa and passed rapidly through the small bowel while providing excellent radiographic visualization thereof.

Example 15

| | Percent, w./w. dry basis |
|---|---|
| Barium sulfate (50% slurry) | 97.2 |
| Sorbitol | 1.94 |
| Mannitol | 0.69 |
| Saccharin sodium | 0.0067 |
| Ethyl vanillin | Trace |
| Degraded carrageenin | 0.133 |

A commercial low-viscosity-type carrageenin (Burtonite-Edible-Type 1K–LV–CP, The Burtonite Company, Nutley, New Jersey), is degraded to the proper molecular weight by dissolving it in water to make a 1% solution. Dilute sulfuric acid (10%) is added in sufficient quantity to produce a pH of about 3 (Congo red paper just beginning to turn blue). The temperature of the solution is maintained at 80° C. for 20 minutes whereupon dilute sodium hydroxide solution (10%) is added to neutralize the solution which is then allowed to cool. This 1% weight/weight solution of the degraded carrageenin has a viscosity (Brookfield viscometer, model RVT, spindle No. 1 at 100 r.p.m.) of 17 cps.

The thick slurry (50%) of barium sulfate is stirred and the sorbitol, mannitol, degraded carrageenin, saccharin sodium and ethyl vanillin are added. Upon the addition of the carrageenin the suspension thins to a watery fluid. After thorough mixing the suspension is dried on a drum drier and the free flowing dry concentrate is collected.

150 grams of this concentrate disperses rapidly and easily in 100 ml. of water to form a fluid contrast medium having a viscosity (No. 4 Ford cup) of 10.4 seconds.

In direct air contrast examination of the colon it produces good results with slight bubble formation and a slightly thin coat.

Example 16

| | Percent |
|---|---|
| Barium sulfate | 97.2 |
| Sorbitol | 1.94 |
| Mannitol | 0.69 |
| Degraded carrageenin | 0.107 |
| Sodium CMC–XL | 0.033 |
| Flavoring agents | Trace |

The degraded carrageenin was a commercial product supplied under the trade name Seakem 22 by Marine Colloids, Inc., 24 State Street, New York, New York. It is prepared by acid hydrolysis of carrageenin and is represented as being about 50% calcium salts and about 50% sodium salts. The viscosity of a 2% weight/weight solution is 42 cps., and that of a 1% weight/weight solution is 16–18 cps. (Brookfield viscometer, model RVT #1 spindle at 100 r.p.m.).

A dry concentrate is prepared by the same general method as that described in Example 15.

150 grams of this concentrate disperses rapidly and easily in 100 ml. of water. This viscosity (No. 4 Ford cup) of such a suspension is about 12 seconds.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

What is claimed is:

1. A composition comprising barium sulfate and at least one non-toxic fluidizing agent selected from the group consisting of water-dispersible colloidal anionic ether and ester derivatives of low polymers of monosaccharides, a 2% aqueous solution of which agent at 25° C. has a viscosity rating not greater than approximately 50 centipoises, the proportion of fluidizing agent being in the range of approximately 0.04 gram to approximately 1.0 gram per 100 grams of barium sulfate, said composition being readily dispersible upon the addition of sufficient water, to produce a suspension containing at least 40% weight/weight of barium sulfate.

2. A composition comprising barium sulfate and at least one non-toxic fluidizing agent selected from the group consisting of water-dispersible colloidal anionic ether and ester derivatives of low polymers of monosaccharides, a 2% aqueous solution of which agent at 25° C. has a viscosity rating of not greater than approximately 50 centipoises, the proportion of fluidizing agent being in the range of approximately 0.04 gram to approximately 1.0 gram per 100 grams of barium sulfate, said composition being readily dispersible upon the addition of sufficient water, to produce a suspension having a barium sulfate/water ratio of approximately 1.5, said suspension having a viscosity rating (No. 4 Ford cup) of from about 10 to about 12 seconds.

3. An aqueous suspension comprising approximately 60% weight/weight of barium sulfate and at least one non-toxic fluidizing agent selected from the group consisting of water-dispersible colloidal anionic ether and ester derivatives of low polymers of monosaccharides, a 2% aqueous solution of which agent at 25° C. has a viscosity rating of not greater than approximately 50 centipoises, the proportion of fluidizing agent being in the range of approximately 0.04 gram to approximately 1.0 gram per 100 grams of barium sulfate, said fluidizing agent being dispersed in the aqueous portion of said suspension, and said suspension having a viscosity rating (No. 4 Ford cup) of from about 10 to about 12 seconds.

4. An aqueous suspension comprising barium sulfate and at least one non-toxic fluidizing agent selected from the group consisting of water-dispersible colloidal anionic ether and ester derivatives of low polymers of monosaccharides, a 2% aqueous solution of which agent at 25° C. has a viscosity rating of not greater than approximately 50 centipoises, the proportion of fluidizing agent being in the range of approximately 0.04 gram to approximately 1.0 gram per 100 grams of barium sulfate, said fluidizing agent being dispersed in the aqueous portion of said suspension, the water content of the suspension being sufficient to produce a ratio of barium sulfate to water of approximately 1.5.

5. A composition comprising barium sulfate and at least one non-toxic fluidizing agent selected from the group consisting of water-dispersible colloidal anionic ether and ester derivatives of low polymers of glucose and galactose, a 2% aqueous solution of which agent at 25° C. has a viscosity rating of not greater than approximately 50 centipoises, the proportion of fluidizing agent being in the range of approximately 0.04 gram to approximately 1.0 gram per 100 grams of barium sulfate, said composition being readily dispersible upon the addition of sufficient water, to produce a suspension containing at least 40% weight/weight of barium sulfate.

6. An aqueous composition comprising at least approximately 40% weight/weight of barium sulfate and water-dispersible colloidal sodium carboxymethylcellulose, a 2% aqueous solution of which at 25° C. has a viscosity rating of not greater than approximately 50 centipoises, the proportion of said sodium carboxymethylcellulose bing in the range of approximately 0.04 gram to approximately 1.0 gram per 100 grams of barium sulfate.

7. An aqueous composition comprising at least 40% weight/weight of barium sulfate and water-dispersible colloidal sodium carboxymethylcellulose having a degree of substitution in the range of 0.65–0.85, a 2% aqueous solution of which at 25° C. has a viscosity rating of not greater than approximately 18 centipoises, the proportion of said sodium carboxymethylcellulose being in the range of approximately 0.04 gram to approximately 1.0 gram per 100 grams of barium sulfate.

8. An aqueous composition comprising at least approximately 40% weight/weight of barium sulfate and water-dispersible colloidal sodium dextran sulfate, a 2% aqueous solution of which at 25° C. has a viscosity rating of not greater than approximately 50 centipoises, the proportion of said sodium dextran sulfate being in the range of approximately 0.04 gram to approximately 1.0 gram per 100 grams of barium sulfate.

9. An aqueous composition comprising at least approximately 40% weight/weight of barium sulfate and a water-dispersible colloidal anionic ester derivative of a low polymer of galactose, a 2% aqueous solution of which at 25° C. has a viscosity rating of not greater than approximately 50 centipoises, the proportion of said derivative of a low polymer of galactose being in the range of approximately 0.04 gram to approximately 1.0 gram per 100 grams of barium sulfate.

10. An aqueous composition comprising at least approximately 40% weight/weight of barium sulfate and water-dispersible colloidal degrated carrageenin, a 1% aqueous solution of which at 25° C. has a viscosity rating of not substantially greater than approximately 18 centipoises, the proportion of said carrageenin being in the range of approximately 0.04 gram to approximately 1.0 gram per 100 grams of barium sulfate.

11. An aqueous composition comprising at least 40% weight/weight of barium sulfate and a mixture of water-dispersible colloidal sodium carboxymethylcellulose, a 2% aqueous solution of which at 25° C. has a viscosity rating of not greater than approximately 50 centipoises and water-dispersible colloidal degrated carrageenin, a 1% aqueous solution of which at 25° C. has a viscosity rating of not substantially greater than 18 centipoises, the proportion of said mixture being in the range of approximately 0.04 gram to approximately 1.0 gram per 100 grams of barium sulfate.

References Cited by the Examiner
UNITED STATES PATENTS

| | | | |
|---|---|---|---|
| 1,861,696 | 6/1932 | Harth | 167—95 |
| 2,155,658 | 4/1939 | Hermann et al. | 167—95 |
| 2,659,690 | 11/1953 | Slaybaugh | 167—95 |
| 2,677,645 | 5/1954 | Allen | 167—95 |
| 2,680,089 | 6/1954 | Lowy | 167—95 |
| 2,715,091 | 8/1955 | Ricketts et al. | 260—234 |
| 2,746,906 | 5/1956 | Novak et al. | 167—95 |
| 2,996,433 | 8/1961 | Hoppe et al. | 167—95 |
| 3,033,757 | 5/1962 | Hallett | 167—95 |

FOREIGN PATENTS

| | | |
|---|---|---|
| 478,108 | 1/1938 | Great Britain. |

OTHER REFERENCES

Hodges: The Journal of the American Medical Association, 153 (16): 1417–1421, Dec. 19, 1953.

Merck Index, Merck and Co., Rahway, N.J., 1960, pages 496 and 976.

Noller: Chemistry of Organic Compounds, W. B. Saunders Co., Philadelphia, Pa. (1957), pp. 396–399, and 407–409.

JULIAN S. LEVITT, *Primary Examiner.*

FRANK CACCIAPAGLIA, *Examiner.*